United States Patent
Kawakami et al.

(10) Patent No.: US 7,922,786 B2
(45) Date of Patent: *Apr. 12, 2011

(54) NANOPARTICLE PRODUCTION METHOD AND PRODUCTION DEVICE AND NANOPARTICLE PRESERVATION METHOD

(75) Inventors: Tomonori Kawakami, Hamamatsu (JP); Bo Li, Wuhan (CN); Mitsuo Hiramatsu, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/213,977

(22) Filed: Jun. 26, 2008

(65) Prior Publication Data
US 2008/0265070 A1  Oct. 30, 2008

Related U.S. Application Data

(62) Division of application No. 10/525,654, filed as application No. PCT/JP03/10962 on Aug. 28, 2003, now abandoned.

(30) Foreign Application Priority Data

Aug. 30, 2002 (JP) ................ P2002-255973

(51) Int. Cl.
B22F 9/06 (2006.01)
(52) U.S. Cl. .................... 75/331; 266/201
(58) Field of Classification Search ........... 75/331; 266/201; 241/1
See application file for complete search history.

(56) References Cited

U.S. PATENT DOCUMENTS

| 4,482,375 A | 11/1984 | Sastry et al. |
| 5,582,957 A | 12/1996 | Sirianni et al. |
| 6,068,800 A | 5/2000 | Singh et al. |

(Continued)

FOREIGN PATENT DOCUMENTS

GB  101 60 817 A1  6/2003

(Continued)

OTHER PUBLICATIONS

Teruki Sugiyama, et al., "Formation of 10mm-sized Oxo (phtalocyaninato) Vanadium (IV) Particles by Femtosecond Laser Ablation in Water", Chemistry Letters, vol. 33, No. 6 (2004) p. 724-p. 725.

Bo Li et al., "Enhancement of Organic Nanoparticle Preparation by Laser Ablation in Aqueous Solution Using Surfactants", Applied Surface Science 210 (2003), pp. 171-176.

(Continued)

Primary Examiner — Scott Kastler
(74) Attorney, Agent, or Firm — Drinker Biddle & Reath LLP

(57) ABSTRACT

With this invention, in a nanoparticle production method, wherein nanoparticles are produced by irradiating a laser light irradiation portion 2a of a to-be-treated liquid 8 with a laser light, in which suspended particles are suspended, to pulverize the suspended particles in laser light irradiation portion 2a, laser light irradiation portion 2a of to-be-treated liquid 8 is cooled. In this case, by the cooling of to-be-treated liquid 8, the respective suspended particles are cooled in their entireties. When the portion 2a of this to-be-treated liquid 8 is irradiated with the laser light, the laser light is absorbed at the surfaces of the suspended particles at portion 2a. Since to-be-treated liquid 8 is cooled during this process, significant temperature differences arise between the interiors and surfaces of the suspended particles and between the surfaces of the suspended particles and the to-be-treated liquid at laser light irradiation portion 2a, and highly efficient nanoparticulation is realized.

7 Claims, 4 Drawing Sheets

U.S. PATENT DOCUMENTS

| | | |
|---|---|---|
| 6,251,159 B1 | 6/2001 | Angeliu et al. |
| 6,939,388 B2 | 9/2005 | Angeliu |
| 7,144,441 B2 | 12/2006 | Huang et al. |
| 7,597,277 B2 * | 10/2009 | Kawakami et al. ............... 241/1 |
| 2007/0152360 A1 * | 7/2007 | Kawakami et al. ............... 264/5 |

FOREIGN PATENT DOCUMENTS

| | | |
|---|---|---|
| JP | 09-171920 | 6/1997 |
| JP | 2001-113159 | 4/2001 |
| WO | 01/08795 | 2/2001 |

OTHER PUBLICATIONS

Bo Li et al., "Surfactant Effects on Optical Absorption Spectra of Iron Phthalocyanine Nanoparticles in Water", Materials Research Bulletin 39 (2004), pp. 1265-1269.

Yoshiaki Tamaki et al., "Nanoparticle Formation of Vanadyl Phthalocyanine by Laser Ablation of Its Crystalline Power in a Poor Solvent", J. Physc. Chem. A 2002, 106, pp. 2135-2139.

Yoshiaki Tamaki et al., "Tailoring Nanoparticles of Aromatic and Dye Molecules by Excimer Laser Irradiation", Applied Surface Science 168 (2000), pp. 85-88.

* cited by examiner

NANOPARTICLE PRODUCTION METHOD AND PRODUCTION DEVICE AND NANOPARTICLE PRESERVATION METHOD

This is a divisional application of copending Application No. 10/525,654, having a §371 date of Sep. 16, 2005, now abandoned, which is a national stage filing based on PCT International Application No. PCT/JP03/10962, filed on Aug. 28, 2003. The copending Application No. 10/525,654 is incorporated by reference herein in its entirety.

TECHNICAL FIELD

This invention concerns a nanoparticle production method and production device and a nanoparticle preservation method, and to be more specific, concerns a nanoparticle production method and production device, with which nanoparticles are produced by irradiating a laser light irradiation portion of a to-be-treated liquid with a laser light, wherein suspended particles are suspended, to pulverize the suspended particles in the laser light irradiation portion, and a nanoparticle preservation method.

BACKGROUND ART

Nanoparticulation brings about extreme increase of surface area. Thus with nanoparticles, the reactivity with the surroundings is thus high and properties unique to a substance are exhibited readily. Also, in the case where the particles are of a poorly soluble or insoluble substance, by nanoparticulation, the nanoparticles can be put in state of pseudo-dissolution in a solvent (a state wherein the nanoparticles, though being suspended in the solvent, appear to be pseudo-dissolved due to the lack of light scattering).

Nanoparticulation arts thus have the possibility of providing methods of preparing new substances, and applications are anticipated in a wide range of fields.

As a prior-art nanoparticulation method, there is known the method disclosed in Japanese Patent Application Laid-open No. 2001-113159. This document discloses a nanoparticulation method, wherein after dispersing an organic compound in a solvent, microparticles (nanoparticles) of this organic compound are obtained by irradiation with a laser light.

DISCLOSURE OF THE INVENTION

However, with the nanoparticulation method described in the above prior document, the efficiency of nanoparticulation was still inadequate.

This invention has been made in view of the above circumstance and an object thereof is to provide a nanoparticle production method and production device, with which nanoparticulation of high efficiency can be realized, and a nanoparticle preservation method.

The present inventors have found, as a result of diligent research towards resolving the above issue, that the efficiency of nanoparticulation is increased extremely by cooling a laser light irradiation portion and irradiating the portion with a laser light, and have thus come to complete the present invention.

That is, this invention's nanoparticle production method comprises: a nanoparticle production step of producing nanoparticles by irradiating a laser light irradiation portion of a to-be-treated liquid with a laser light, wherein suspended particles are suspended, to pulverize the suspended particles in the laser light irradiation portion; and wherein the laser light irradiation portion of the to-be-treated liquid is cooled prior to irradiation of the laser light irradiation portion with the laser light.

With this invention, by the to-be-treated liquid being cooled, the respective suspended particles are cooled in their entireties. When the cooled laser light irradiation portion of the to-be-treated liquid is irradiated with the laser light, the laser light is absorbed at the surfaces of the suspended particles in the laser light irradiation portion. Since the to-be-treated liquid is cooled at this time, significant temperature differences arise between the interiors and surfaces of the suspended particles and between the surfaces of the suspended particles and the to-be-treated liquid at the laser light irradiation portion. The suspended particles are thus pulverized readily and nanoparticulation of high efficiency is carried out.

Also, this invention's nanoparticle production device comprises: a treatment chamber, containing a to-be-treated liquid; a nanoparticle production laser device, irradiating a laser light irradiation portion of the to-be-treated liquid with a nanoparticle production laser light; and a temperature adjustment device, enabled to cool the laser light irradiation portion of the to-be-treated liquid; and wherein nanoparticles are produced by irradiating the laser light irradiation portion of the to-be-treated liquid with the nanoparticle production laser light, wherein suspended particles are suspended, to pulverize the suspended particles in the laser light irradiation portion.

With such a device, the above-described nanoparticle production method can be carried out effectively. That is, with this invention's device, by the to-be-treated liquid being set to a low temperature by the temperature adjustment device, the respective suspended particles are cooled in their entireties. When the laser light irradiation portion of the to-be-treated liquid is then irradiated with the nanoparticle production laser light by the nanoparticle production laser device, the nanoparticle production laser light is mainly absorbed at the surfaces of the suspended particles in the laser light irradiation portion. Since the to-be-treated liquid is cooled at this point, significant temperature differences arise between the interiors and surfaces of the suspended particles and between the surfaces of the suspended particles and the to-be-treated liquid at the laser light irradiation portion. The suspended particles are thus pulverized readily and nanoparticulation of high efficiency is carried out.

Also, this invention's nanoparticle preservation method is characterized in that a to-be-treated liquid, in which nanoparticles are suspended, is preserved in a solid-phase state. By this preservation method, the state in which nanoparticles are suspended can be preserved over a long period of time.

BEST MODES FOR CARRYING OUT THE INVENTION

Embodiments of this invention shall now be described in detail.

Figure 1:
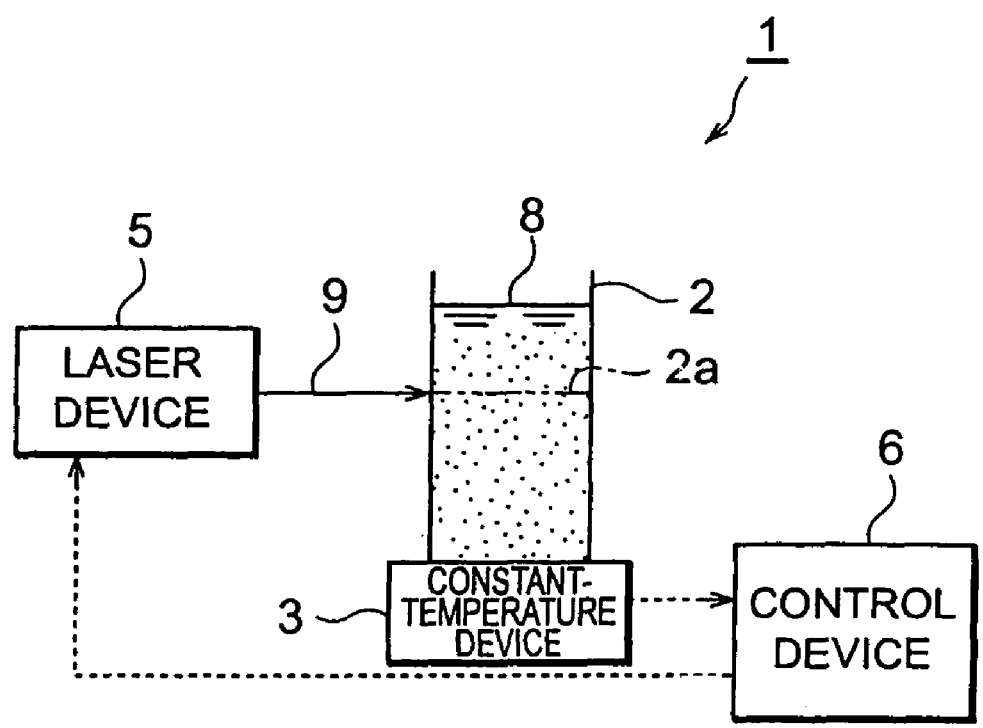
FIG. 1 is a schematic view showing an embodiment of a nanoparticle production device.

FIG. 1 is a schematic view showing a first embodiment of this invention's nanoparticle production device. As shown in FIG. 1, a nanoparticle production device 1 is equipped with a treatment chamber 2, containing a to-be-treated liquid 8 in which suspended particles are suspended, a constant-temperature device (temperature adjustment device) 3, which can cool to-be-treated liquid 8 in treatment chamber 2 to a low temperature no more than room temperature and can rapidly cool to-be-treated liquid 8, and a stirring device (not shown), which stirs to-be-treated liquid 8 inside treatment chamber 2.

Nanoparticle production device 1 is also equipped with a nanoparticle production laser device 5, which irradiates a laser light irradiation portion 2a of treatment chamber 2 with a nanoparticle production laser light 9 to thereby pulverize the suspended particles and produce nanoparticles, and a control device 6, controlling constant-temperature device 3 and laser device 5. As to-be-treated liquid 8, for example, a suspension of vanadyl phthalocyanine (referred to hereinafter as "VOPc") particles in water, is used.

As treatment chamber 2, one that is formed of quartz or other material, which is transparent to the wavelength of laser light 9 emitted from nanoparticle production laser device 5, is used. The stirring device comprises, for example, a magnetic stirrer and a stirring element. Also as constant-temperature device 3, for example, a cooling device that makes use of a Peltier element or a rapid cooling device that makes use of liquid nitrogen, etc., is favorably used.

Nanoparticle production laser device 5 is preferably one that emits laser light of a wavelength in the range of 400 to 180 nm. If the wavelength is longer than 400 nm, the nanoparticulation efficiency tends to decrease, and if the wavelength is shorter than 180 nm, the optical energy of laser irradiation tends to be absorbed by the solvent, which for example is water. Nanoparticle production laser device 5 is equipped with a laser light source. If, for example, an Nd:YAG laser is to be used as the laser light source, since the fundamental wavelength of an Nd:YAG laser is 1064 nm, laser device 5 must be equipped furthermore with a higher harmonic unit that includes the nonlinear optic crystal KDP, in order to convert the light of fundamental wavelength to a light of the third harmonic (wavelength: 355 nm). Also, an excimer laser (193 nm, 248 nm, 308 nm, 351 nm) or a nitrogen laser (337 nm) may be used as the laser light source.

Control device 6 performs temperature control of the to-be-treated liquid, on/off control of laser irradiation, control of the irradiation time etc., for example, by activating laser device 5 when the temperature of constant-temperature device 3 falls to a predetermined value or less and stopping laser device 5 when the temperature of constant-temperature device 3 exceeds a predetermined value to thereby constantly maintain the nanoparticulation treatment at high efficiency.

A nanoparticle production method using the above-described nanoparticle production device 1 shall now be described.

First, to-be-treated liquid 8, in which the suspended particles to be subject to nanoparticulation are suspended, is loaded into treatment chamber 2. To-be-treated liquid 8 is then stirred by the stirring device. The suspended state of suspended particles in to-be-treated liquid 8 is thereby maintained.

To-be-treated liquid 8 is then cooled by constant-temperature device 3. The respective suspended particles are thereby cooled in their entireties. In this process, to-be-treated liquid 8 is cooled to room temperature or less and preferably to 10° C. or less.

When the temperature has dropped to a predetermined temperature or less, laser device 5 is activated by control device 6, and the laser light irradiation portion 2a of to-be-treated liquid 8, contained inside treatment chamber 2, is irradiated with laser light 9 from laser device 5 (nanoparticle production step). In this step, the laser light is mainly absorbed at the surfaces of the suspended particles in laser light irradiation portion 2a. Since the to-be-treated liquid is set to a low temperature no more than the predetermined temperature, significant temperature differences arise between the interiors and surfaces of the suspended particles and between the surfaces of the suspended particles and the to-be-treated liquid. The suspended particles are thus pulverized readily and nanoparticulation of high efficiency is carried out.

As nanoparticles are thus formed, since the nanoparticles become less likely to scatter light, a pseudo-dissolution state, in other words, a transparent state is achieved as nanoparticulation progresses. The formation of nanoparticles can thus be judged by the transparency of the to-be-treated liquid.

Also, the pulse repetition frequency is preferably a high repetition frequency in consideration of the treatment efficiency. However, since the to-be-treated liquid is heated at high frequency, the pulse repetition frequency must be set so as to be of a heating energy with which the performance of the constant-temperature device can be maintained.

The nanoparticles that are formed as described above are normally active. Thus when laser device 5 is stopped after nanoparticle formation and the nanoparticles are left as they are in this state for some time, the nanoparticles aggregate. The aggregation of nanoparticles must thus be prevented to maintain the dispersed state of the nanoparticles. For this purpose, after nanoparticle formation, to-be-treated liquid 8 is subject to rapid cooling solidification (rapid cooling solidification step) by constant-temperature device 3. The suspended state of the nanoparticles can thereby be maintained over a long period of time.

Here, "rapid cooling" refers to a state of cooling with which the rate of progress of solidification of the laser light irradiation portion is higher than the rate of Brownian motion of the nanoparticles. With gradual cooling solidification that does not meet this state, the probability that the nanoparticles will be captured inside the solidified solid phase will be low and the nanoparticles will tend to aggregate in the non-solidified liquid phase.

To preserve the nanoparticles, to-be-treated liquid 8 is maintained at a temperature no more than its solidification point after rapid cooling solidification. That is, to-be-treated liquid 8 is maintained in the solid phase state. Thus after rapid cooling solidification, storage in a normal freezer is adequate. The nanoparticles can thereby be preserved in the suspended state over a long period of time.

A second embodiment of this invention's nanoparticle production device shall now be described.

Figure 2:
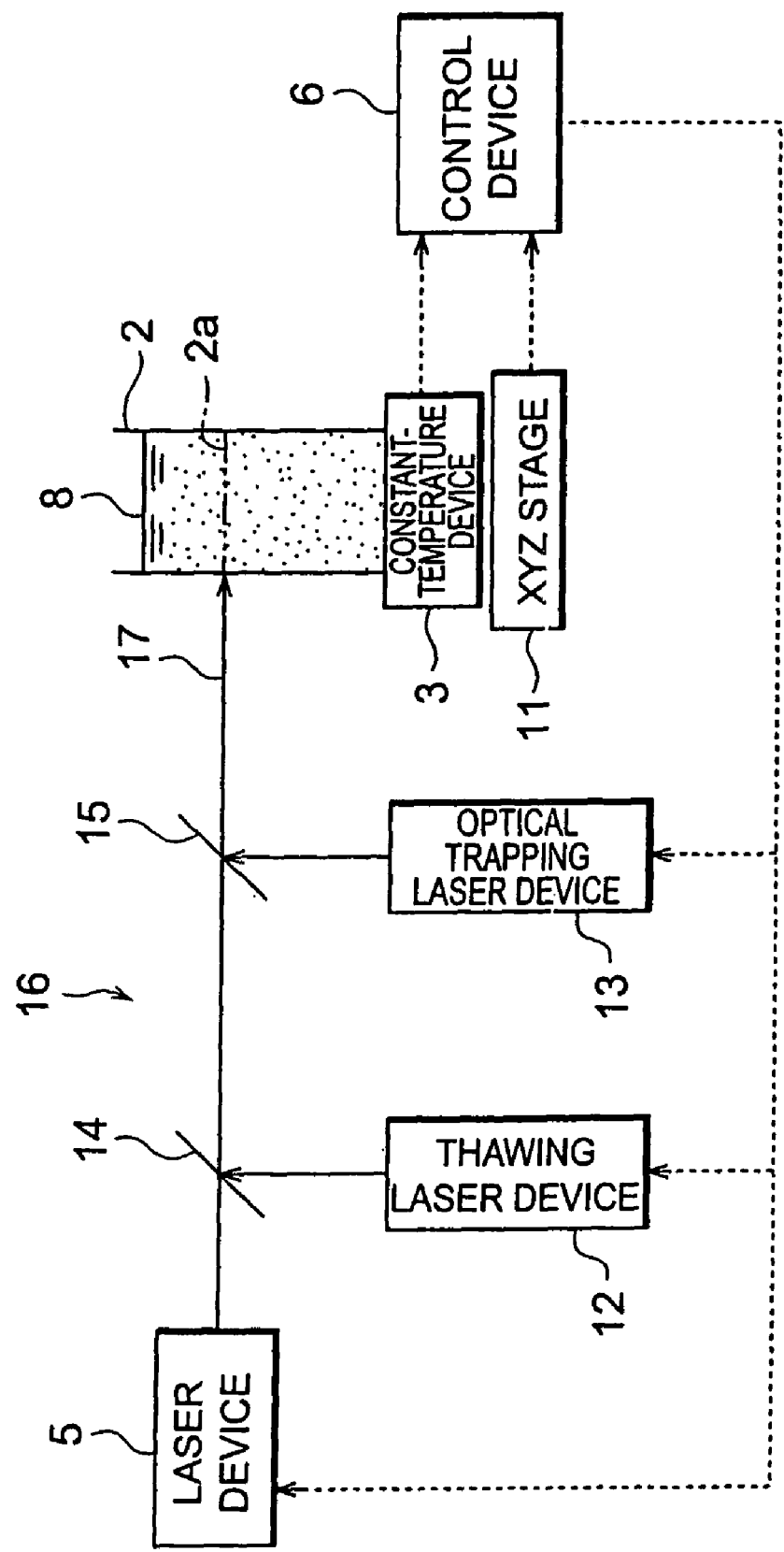
FIG. 2 is a schematic view showing another embodiment of a nanoparticle production device.

FIG. 2 is a schematic view showing the second embodiment of this invention's nanoparticle production device. As shown in FIG. 2, this embodiment's nanoparticle production device 10 differs from nanoparticle production device 1 of the first embodiment firstly in being further equipped with an XYZ stage 11 for moving treatment chamber 2, a thawing laser device 12, which, when to-be-treated liquid 8 inside treatment chamber 2 is made a solidified body, thaws laser light irradiation portion 2a of that solidified body, an optical trapping laser device 13, which gathers suspended particles to the center of the thawed laser light irradiation portion 2a by the optical trapping action of a laser light, and an optical system 16, which irradiates the same portion of the to-be treated liquid with the respective laser lights from thawing laser device 12, optical trapping laser device 13, and nanoparticle production laser device 5.

Here as thawing laser device 12, a laser device that emits laser light of a wavelength at which absorption by the to-be-treated liquid or the suspended particles occurs is preferable. For example, in the case where the suspended particles are VOPc, since VOPc absorbs light in the wavelength range of 500 to 900 nm, an argon ion laser (488 nm, 514 nm) is used for example as thawing laser device 12. Also as optical trapping laser device 13, a laser device that emits laser light of a wavelength at which there is no absorption by the to-be-treated liquid or the suspended particles is preferable. For example, in the case where the suspended particles are VOPc, since VOPc absorbs light in the wavelength range of 500 to 900 nm, a YAG laser (1064 nm) is for example used as optical trapping laser device 13.

Also, along the line joining nanoparticle production laser device 5 and laser light irradiation portion 2a of treatment chamber 2, that is, along an optical axis 17, a first half-mirror 14 and a second half-mirror 15 are disposed, for example, as optical system 16. The thawing laser light that is emitted from thawing laser device 12 is arranged to be reflected by first half-mirror 14, pass along optical axis 17 of nanoparticle production laser device 5, and the same portion as the above-mentioned laser light irradiation portion 2a is irradiated with the thawing laser light. Also, the optical trapping laser light emitted from optical trapping laser device 13 is arranged to be reflected by second half-mirror 15, pass along optical axis 17 of nanoparticle production laser device 5, and the same portion as the above-mentioned laser light irradiation portion 2a is irradiated with the optical trapping laser light.

Furthermore with nanoparticle production device 10, by moving XYZ stage 11, laser light irradiation position 2a in treatment chamber 2 can be changed freely.

Secondly, nanoparticle production device 10 differs from nanoparticle production device 1 of the first embodiment in that control device 6 controls nanoparticle production laser device 5, thawing laser device 12, and optical trapping laser device 13 in association with constant-temperature device 3 and XYZ stage 11.

With nanoparticle production device 10 of the present embodiment, nanoparticulation of suspended particles is carried out in the following manner.

Figure 3:
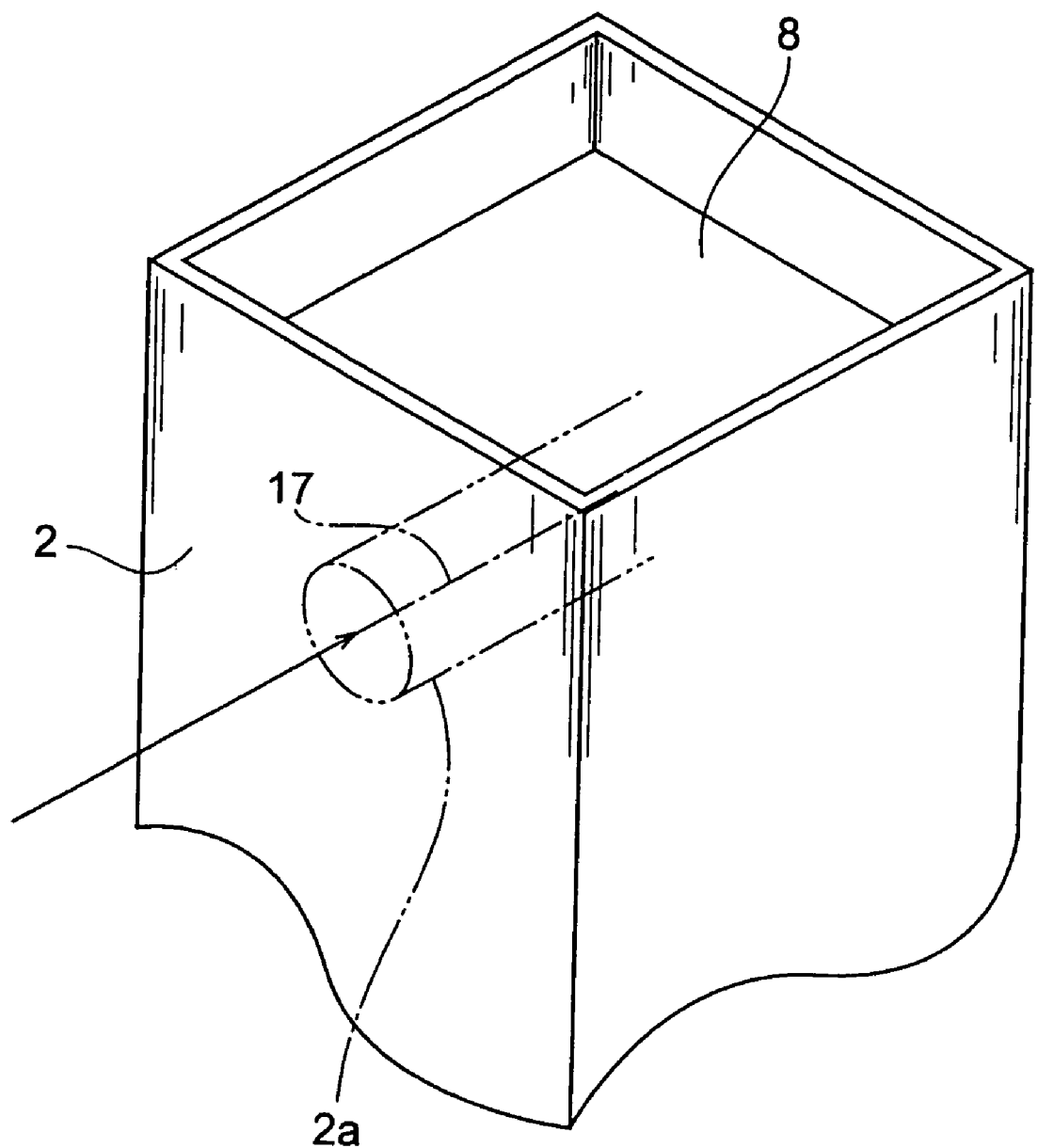
FIG. 3 is a perspective partial view of a treatment chamber.

That is, first, XYZ stage 11 is moved to set laser light irradiation portion 2a in treatment chamber 2. As shown in FIG. 3, laser irradiation portion 2a is the region through which laser light passes. The entirety of to-be-treated liquid 8 is then cooled and solidified and made into a solidified body by means of constant-temperature device 3 (cooling solidification step). Thereafter, this temperature is maintained.

Next, thawing laser device 12 is activated and made to emit the thawing laser light. The thawing laser light is reflected by first half-mirror 14 and the laser light irradiation portion 2a of the solidified body is irradiated with the thawing laser light. The thawing laser light is thus absorbed by to-be-treated liquid 8 or the suspended particles in laser light irradiation portion 2a, heat is thereby generated, and laser light irradiation portion 2a is thawed by this heat (thawing step).

Then while keeping thawing laser device 12 activated, optical trapping laser device 13 is activated and made to emit the optical trapping laser light. The optical trapping laser light is reflected by second half-mirror 15 and the laser light irradiation portion 2a is irradiated with the optical trapping laser light (optical trapping step). In this process, suspended particles of large particle diameter that exist in the thawed laser irradiation portion 2a gather along optical axis (center of the laser irradiation portion) 17 due to the optical trapping action of the optical trapping laser light. The optical trapping action is stronger the larger the particle diameter of a particle, and selective positioning of particles of large particle diameter along optical axis 17 is thereby enabled. The concentration of suspended particles along optical axis 17 of laser light irradiation portion 2a thus increases. Such an art provides the merits of preventing the aggregation of nanoparticles with each other at portions outside the laser light irradiation portion and enabling a cooling treatment to be carried out in a comparatively simple manner since thawing of just a localized portion is performed.

Lastly, with thawing laser device 12 and optical trapping laser device 13 being kept activated, nanoparticle production laser device 5 is activated. The nanoparticle production laser light is transmitted successively through first half-mirror 14 and second half-mirror 15 and the laser light irradiation portion 2a is irradiated with the nanoparticle production laser light (nanoparticle production step). At this point, the suspended particles in laser light irradiation portion 2a are in a state of high concentration. Also, the laser light intensity is normally high at the center of laser light irradiation portion 2a. Thus when the laser light irradiation portion 2a is irradiated with the nanoparticle production laser light by nanoparticle production laser device 5, light pulverization of even higher efficiency can be realized.

After the nanoparticulation treatment, the irradiations with laser light by thawing laser device 12, optical trapping laser device 13, and nanoparticle production laser device 5 are stopped (laser irradiation stopping step). The cooling of the thawed portion thus begins, and since this portion is localized, rapid cooling solidification occurs naturally. By then keeping this solidified body at a low temperature no more than the solidification point of the to-be-treated liquid, the suspended state of the nanoparticles can be maintained over a long period of time.

This invention is not limited to the above-described first and second embodiments. For example, though with the above-described embodiments, VOPc, which is an organic compound, is used as the suspended particles, the suspended particles are not limited to those of VOPc and may be those of other organic compounds. Ibuprofen, clobetasone butyrate, etc., which are insoluble medical agents, can be cited as examples.

Also, though with the above-described embodiments, water is used as the solvent for suspending VOPc, the combination of suspended particles and solvent is not limited thereto, and any combination with which suspended particles are suspended in a solvent may be used.

Furthermore with the above-described embodiments, a surfactant (for example, SDS or other ionic surfactant, Igepal or other nonionic surfactant that does not become ionized, Tween, which is permitted to be added to medical products, etc.) is preferably added to the to-be-treated liquid prior to the irradiation with the nanoparticle production laser light. In this case, nanoparticulation of higher efficiency is carried out when the to-be-treated liquid is irradiated with the nanoparticle production laser light. Also, after the laser light irradiation, the aggregation of the nanoparticles formed is prevented adequately.

Also, though with the above-described embodiment, nanoparticles produced by the above-described nanoparticle production methods are used as the nanoparticles to be preserved, the nanoparticles preserved by this invention's nanoparticle preservation method is not limited to just the nanoparticles produced by the above-described nanoparticle production methods and may instead be nanoparticles that have been produced by a production method other than the above-described nanoparticle production methods.

Though the details of this invention shall now be described more specifically by way of examples, this invention is not limited to the following examples.

EXAMPLE 1

3 ml of a sample solution, prepared by suspending a VOPc powder in water (VOPc: 0.5 mg/ml), were dispensed in a 10 mm×10 mm×40 mm rectangular quartz cell, and thereafter the temperature of the sample solution was lowered to 5° C. using a constant-temperature device (131-0040 Constant-Temperature Cell Holder with Temperature Display, made by Hitachi).

The sample solution was then irradiated with the third harmonic of an Nd:YAG laser (80 mJ/cm$^2$ pulse, FWHM=4 ns, 20 Hz) for 15 minutes. As a result, the entirety of the sample solution became transparent. It is thus considered that nanoparticulation VOPc progressed and pseudo-dissolution of the nanoparticles occurred.

Figure 4:
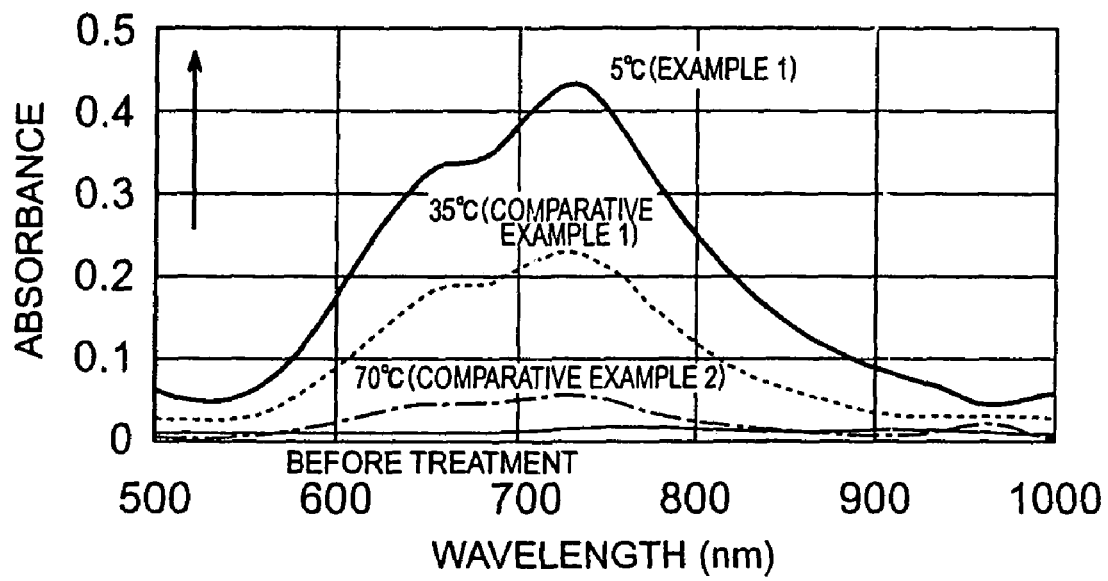
FIG. 4 is a graph showing absorbance measurement results of an Example 1 and Comparative Examples 1 and 2.

The absorbance of the sample solution after laser light irradiation was then measured by an absorbance measuring device. The result is shown in FIG. 4. As shown in FIG. 4, the absorbance was found to be significantly high in the vicinity of 500 to 900 nm, which is the absorbance wavelength range of VOPc. Since when VOPc particles that are suspended in a to-be-treated liquid are made fine, the inherent light absorption of the particles increase due to the increase of surface area, the above result shows that nanoparticles were formed efficiently by the light irradiation treatment. Of the four absorbance curves, the absorbance curve at the lowest position is that prior to laser light irradiation.

Next, in order to maintain the pseudo-dissolution state of the nanoparticles in the sample solution, rapid cooling by liquid nitrogen was performed so that the rate of progress of solidification of the sample solution by the constant-temperature device will be higher than the rate of Brownian motion of the nanoparticles. As a result, the sample solution solidified while remaining transparent. It is thus considered that by performing such rapid cooling, it was possible to maintain the pseudo-dissolution state of the nanoparticles and adequately prevent the aggregation of the nanoparticles.

When the sample solution subject to laser light irradiation in this Example was cooled by placing the sample solution in a normal refrigerator, the formation of a non-transparent portion at the interface between the solidified body and the to-be-treated liquid was seen, indicating that the obtained pseudo-dissolution state of the nanoparticles was greatly degraded. It is thus considered that with normal cooling, the rate of progress of solidification of the to-be-treated liquid is slower than the rate of Brownian motion of the nanoparticles, the probability of the nanoparticles becoming captured in the solidified solid phase is low, and the aggregation of the nanoparticles occurs in the non-solidified liquid phase.

COMPARATIVE EXAMPLE 1

Besides setting the temperature of the sample solution to 35° C., nanoparticulation of VOPc was carried out in the same manner as in Example 1. The absorbance of the sample solution was then measured in the same manner as in Example 1. The result is shown in FIG. 4. As shown in FIG. 4, the absorbance is considerably lower in comparison to Example 1. It is thus considered that the efficiency of formation of nanoparticles after light irradiation treatment is inadequate.

COMPARATIVE EXAMPLE 2

Besides setting the temperature of the sample solution to 70° C., nanoparticulation of VOPc was carried out in the same manner as in Example 1. The absorbance of the sample solution was then measured in the same manner as in Example 1. The result is shown in FIG. 4. As shown in FIG. 4, the absorbance is not only Considerably lower in comparison to Example 1 but is also considerably lower in comparison to Comparative Example 1. It is thus considered that the efficiency of formation of nanoparticles after light irradiation treatment is inadequate.

EXAMPLE 2

In this Example, nanoparticulation treatment of VOPc was carried out as follows using the device of FIG. 2.

First, XYZ stage 11 was moved to set the laser light irradiation portion in the 10 mm×10 mm×40 mm rectangular quartz cell. 3 ml of a sample solution, prepared by suspending VOPc powder in water (VOPc: 0.5 mg/ml), was then dispensed in the rectangular quartz cell. Thereafter, using the same constant-temperature device as in Example 1, the sample solution was cooled to and solidified at −5° C., thereby obtaining a solidified body.

Then using an argon ion laser (514 nm) as thawing laser device 12, the above-mentioned laser light irradiation portion was irradiated with a thawing laser light.

Then using a YAG laser (1064 nm) as optical trapping laser device 13, an optical trapping laser light was emitted and the above-mentioned laser light irradiation portion was irradiated with the optical trapping laser light.

Lastly, using the third harmonic light (wavelength: 355 nm) of an Nd:YAG laser as nanoparticle production laser device 5, the laser light irradiation portion was irradiated with a nanoparticle production laser light. After 10 seconds of irradiation, the laser light irradiation portion of the solidified body became transparent. Comparison of this result with that of Example 1 in consideration of the cross-section of the irradiation laser shows that, since the treatment of making the entire to-be-treated liquid of 3 ml transparent was completed in 15 minutes with Example 1 and in 7 to 8 minutes with Example 2, nanoparticulation occurred at a higher efficiency than in the case of Example 1.

After the nanoparticulation treatment, the irradiations with laser light by the argon ion laser, YAG laser, and the third harmonic of the Nd:YAG laser were stopped. As a result, the laser light irradiation portion remained transparent. It is thus considered that by rapid cooling of the thawed portion, it was possible to maintain the pseudo-dissolution state of the nanoparticles and adequately prevent the aggregation of the nanoparticles.

INDUSTRIAL APPLICABILITY

As described above, this invention's nanoparticle production method and production device can be used as a production method and production device that can realize nanoparticulation of high efficiency by lowering of the temperature of the to-be-treated liquid. Furthermore, long-term maintenance of the suspended state of the nanoparticles is enabled by rapid cooling solidification after the nanoparticulation treatment.

Also, this invention's nanoparticle preservation method can be used as a preservation method that enables long term preservation of the state in which nanoparticles are suspended.

The invention claimed is:

1. A nanoparticle production method comprising:
a nanoparticle production step of producing nanoparticles by irradiating a laser light irradiation portion of a to-be-treated liquid with a laser light, wherein suspended particles are suspended, to pulverize the suspended particles in the laser light irradiation portion; and wherein the laser light irradiation portion of the to-be-treated liquid is cooled prior to irradiation of the laser light irradiation portion with the laser light.

2. The nanoparticle production method according to claim 1, further comprising, after the nanoparticle production step, a rapid cooling solidification step of rapidly cooling and solidifying the laser light irradiation portion.

3. The nanoparticle production method according to claim 2, wherein in the rapid cooling solidification step, the rapid cooling solidification is carried out at a cooling rate with which the rate of progress of solidification of the laser light irradiation portion is higher than the rate of Brownian motion of the nanoparticles.

4. The nanoparticle production method according to claim 1, further comprising:
   a cooling solidification step of, prior to the nanoparticle production step, cooling and solidifying the to-be-treated liquid and thereby obtaining a solidified body;
   a thawing step of irradiating the laser light irradiation portion of the solidified body with a thawing laser light and thawing the laser light irradiation portion; and
   an optical trapping step of irradiating the laser light irradiation portion with an optical trapping laser light and gathering the suspended particles to the center of the laser light irradiation portion by the optical trapping action of the optical trapping laser light.

5. The nanoparticle production method according to claim 4, further comprising, after the nanoparticle production step, a laser irradiation stopping step of stopping the irradiations with the thawing laser light, the optical trapping laser light, and the nanoparticle production laser light.

6. A nanoparticle production device comprising:
   a treatment chamber, containing a to-be-treated liquid;
   a nanoparticle production laser device, irradiating a laser light irradiation portion of the to-be-treated liquid with a nanoparticle production laser light; and
   a temperature adjustment device, enabled to cool the laser light irradiation portion of the to-be-treated liquid; and
   wherein nanoparticles are produced by irradiating the laser light irradiation portion of the to-be-treated liquid with the nanoparticle production laser light, wherein suspended particles are suspended, to pulverize the suspended particles in the laser light irradiation portion.

7. The nanoparticle production device according to claim 6, further comprising:
   a thawing laser device, irradiating the laser light irradiation portion with a thawing laser light when the laser light irradiation portion is made into a solidified body by cooling solidification of the to-be-treated liquid and thereby thawing the laser light irradiation portion; and
   an optical trapping laser device, irradiating the laser light irradiation portion with an optical trapping laser light and thereby gathering the suspended particles to the center of the laser light irradiation portion.

* * * * *